United States Patent [19]
Rogers

[11] 3,997,311
[45] Dec. 14, 1976

[54] METHOD OF SEPARATING A FUNNEL AND FLANGELESS FACEPLATE OF A COLOR TELEVISION PICTURE TUBE BULB

[75] Inventor: Melvin F. Rogers, Western Springs, Ill.

[73] Assignee: Zenith Radio Corporation, Chicago, Ill.

[22] Filed: Apr. 1, 1976

[21] Appl. No.: 672,816

[52] U.S. Cl. .................................. 65/23; 65/28; 225/2
[51] Int. Cl.² .................................... C03B 33/06
[58] Field of Search ............ 65/23, 28; 225/2, 93.5

[56] References Cited
UNITED STATES PATENTS

| | | | |
|---|---|---|---|
| 2,884,312 | 4/1959 | Kuryla | 65/23 X |
| 3,390,033 | 6/1968 | Brown | 65/23 X |
| 3,894,858 | 7/1975 | Rogers | 65/23 |

Primary Examiner—Arthur D. Kellogg
Attorney, Agent, or Firm—John R. Garrett

[57] ABSTRACT

This disclosure depicts, for use in salvaging parts from a color television cathode ray tube of the type having a glass bulb comprising an approximately rectangular, flangeless, curved faceplate and a funnel having a convex seal land, a novel method for separating the funnel and the faceplate. The funnel seal land mates with a concave rear surface of the faceplate to define a contoured sealing interface. The faceplate is sealed to the funnel with a frit material located at the sealing interface. The method comprises establishing the bulb at a predetermined initial temperature; concurrently down-shocking (effecting a sudden cooling of the surface of) the faceplate and the corner regions of the funnel for a predetermined brief period of time, causing separation at the sealing interface of the faceplate from the corner regions of the funnel; then down-shocking the side regions of the funnel near the sealing interface for a predetermined brief period of time while continuing to down-shock the faceplate and the corner regions of the funnel, to cause a complete separation of the faceplate from the funnel at the sealing interface.

14 Claims, 4 Drawing Figures

METHOD OF SEPARATING A FUNNEL AND FLANGELESS FACEPLATE OF A COLOR TELEVISION PICTURE TUBE BULB

BACKGROUND OF THE INVENTION

This invention relates in general to color television cathode ray tubes and in particular to a method of separating the glass parts of such tubes to permit salvage of tube components. Conventionally, a color television cathode ray tube has a glass bulb which is fabricated in two parts; a funnel, and a flanged faceplate which is sealed to a flared end of the funnel. The faceplate has a concave inner surface on which is deposited an electron-excitable phosphor screen and is sealed to the flared end of the funnel with a frit material which forms an airtight seal along an interface between the funnel and the flange of the faceplate. For numerous reasons, it is desirable to be able to separate the faceplate from the funnel after these glass parts have been sealed together with the frit material. For example, if a completed tube is found to have a defective internal component, separation of the funnel and faceplate permits the tube to be repaired, thereby effecting substantial cost savings.

A well established method of salvaging glass parts from a conventional cathode ray tube involves a process of thermally shocking ("thermoshocking") either the faceplate flange or the funnel alternately with cold and hot water in order to separate the faceplate and funnel.

Thermal shocking of the glass bulb typically is achieved by down-shocking (application of water with a temperature lower than an initial bulb temperature to cause a sudden cooling of the surface of the bulb) or up-shocking (application of water with a temperature which is higher than an initial bulb temperature to cause a sudden heating of the surface of the bulb). This causes the part which has been shocked to flex, thereby causing tension at the sealing interface and a subsequent cleavage through and parallel to the sealing interface. Generally, before thermoshocking the tube, any excess frit material on the outside of the bulb around the sealing interface is etched away by submerging the tube in a nitric acid bath or by spraying nitric acid onto the frit material. Such a method as described above is disclosed in U.S. Pat. No. 2,884,312 to Kuryla. Another related method of separating glass bulbs is disclosed in U.S. Pat. No. 3,390,033 to Brown.

A unique bulb for a color television cathode ray tube is disclosed in U.S. Pat. No. 3,894,260, issued to the assignee of this application. The bulb has a flangeless, curved, glass faceplate with a concave inner surface. The funnel portion of this unique bulb has a convex, curved seal land; that is, a seal land which defines a convex, curved plane which matches and mates with the curvature of the concave inner surface of the faceplate. Since the faceplate is flangeless, the sealing interface between the funnel and the faceplate is curved rather than planer as in conventional tubes.

Attempts to salvage glass parts from this bulb by prior art methods such as described above have resulted in excessive glass breakage. If the faceplate only is shocked, glass is broken out of the funnel at the sealing interface. If the funnel is shocked, separation is usually not achieved because the funnel shape is too rigid for sufficient flexure at the sealing interface. If an attempt is made to shock both the flangeless faceplate and the funnel simultaneously to gain sufficient flexure from both parts, glass is frequently broken out of the funnel seal land from the long side and toward a corner, especially if there is heavy frit material in these areas along the sealing interface on the inside of the bulb.

A crack in glass will usually propagate along a path of maximum tension. With the unique bulb described, if the faceplate and the entire perimeter of the funnel wall adjacent to the sealing interface are shocked, initial separation will usually occur on a short side of the funnel and propagate around a corner to an adjacent long side. As the crack rounds the corner and approaches the long side, the crack departs from the curved plane of the sealing interface since it recognizes a higher tension zone in the funnel glass, which zone may be created by the existence of a heavy deposit of frit material at the sealing interface in that region. If the initial separation is caused to originate on the long side of the funnel, a similar problem of glass breakage on a short side and toward a corner is encountered. Therefore, in general, known prior art methods of salvaging parts from color television cathode ray tube bulbs of the conventional type having a flanged faceplate are not suitable for salvaging bulbs of the type disclosed in U.S. Pat. No. 3,894,260.

OTHER PRIOR ART

U.S. Pat. No. 2,843,925 — Logue et al.,
U.S. Pat. No. 2,852,352 — Landron, Jr.

OBJECT OF THE INVENTION

It is a general object of the present invention to provide for use with a color television cathode ray tube having a glass bulb of a type comprising a flangeless glass faceplate and a mating glass funnel, a method for separating the faceplate from the funnel which is more efficient and economical than prior art methods.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawing in which

DESCRIPTION OF THE PREFERRED EMBODIMENT

Figure 1:
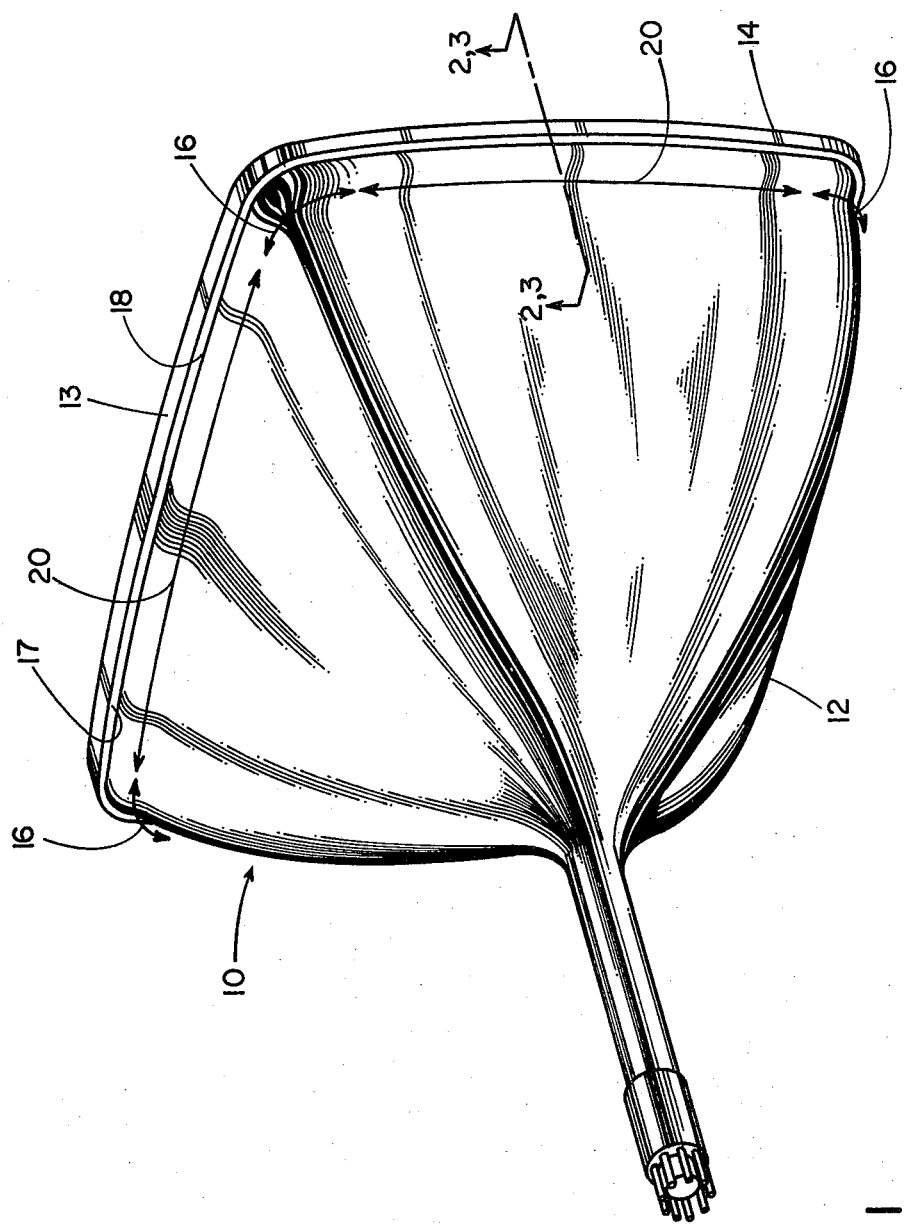
FIG. 1 is a perspective view showing a unique color television cathode ray tube bulb having a glass funnel and a flangeless glass faceplate to which the method of this invention is applied.

This invention pertains to a method for salvaging glass parts from a color television cathode ray tube. Whereas the invention is believed to be applicable to color cathode ray tubes of various types, it is most advantageously used with a tube of the nature shown in FIG. 1. The tube has a glass bulb 10 comprising a funnel 12 sealed to a flangeless faceplate 14. The unique construction of the faceplate 14 without a flange permits economies in manufacture of the glass bulb 10 and simplified and economical screening and assembly processes. The faceplate 14 has a curved configuration which may be spherical, multi-radial, cylindrical or other suitable curvature. The faceplate 14 has a convex front surface 15 connected to a concave rear surface 17 by a peripheral edge surface 13.

The funnel 12 has a convex seal land — herein intended to mean a seal land which lies on an imaginary curved surface which may be spherical, multi-radial, cylindrical or of other suitable curved configurations. The seal land of the funnel 12 is curved to match and mate with the concave rear surface 17 of the faceplate 14 along a sealing interface 18. The seal land of the funnel 12 is hermetically bonded to the rear surface of the faceplate 14 by a devitrifying glass solder, herein termed a frit material 22.

The faceplate 14 is illustrated as being slightly larger than the wide end of the funnel 12 to which the faceplate 14 is attached. Thus, when the tube is assembled the faceplate 14 overhangs the funnel slightly. Alternatively, the faceplate edge surface 13 may be flush with the outside surface of the funnel 12.

The present invention will now be described. In general terms, the most essential steps of the method of this invention involves down-shocking the faceplate 14 and corner regions 16 of the funnel 12 for a brief period of time to cause separation at the sealing interface 18 of the faceplate 14 from the corner regions 16 of the funnel 12. Down-shocking of the faceplate 14 and funnel corner regions 16 is continued while the side regions 20 of the funnel 12 near the sealing interface 18 are then down-shocked. This causes separation at the sealing interface of the complete faceplate 14 from the funnel 12.

Surprisingly, by down-shocking the corner regions 16 first, followed by down-shocking of the side regions 20, the faceplate will separate from the funnel 12 along the sealing interface 18 without damaging the faceplate 14 or the funnel 12. As pointed out in the Background of the Invention, prior art method were found to frequently cause glass to be broken out of the funnel 12 near the sealing interface 18 and, thus, these methods are unacceptable. Applicant's novel method of thermal shocking the glass bulb 10 succeeds where the prior art methods fail.

Figure 2:
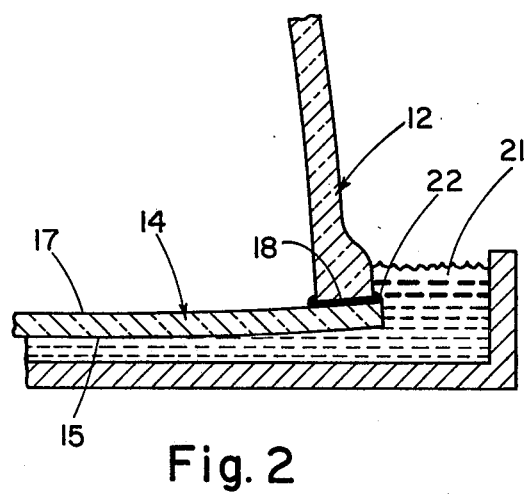
FIGS. 2 and 3 are enlarged, schematic, fragmentary side sectional views of the FIG. 1 bulb during and after an operation wherein a frit material which seals the faceplate to the funnel is partially etched away.
Figure 3:
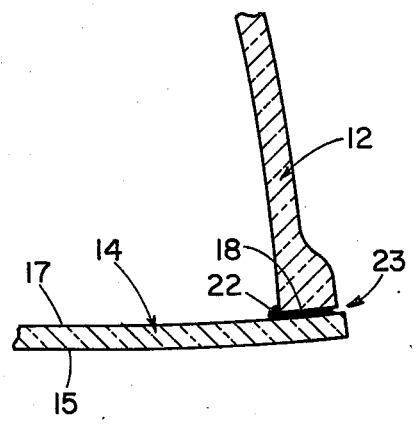
Figure 4:
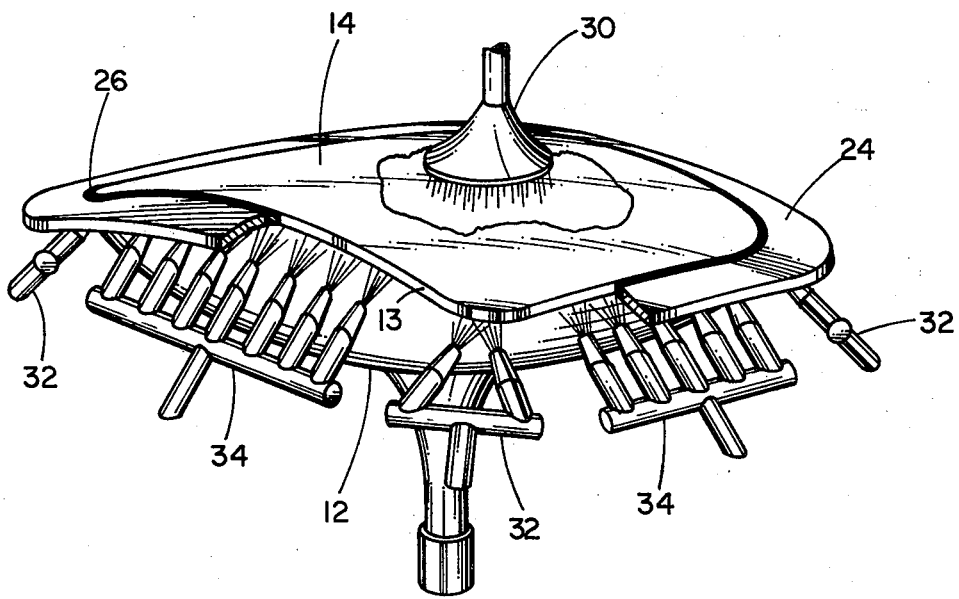
FIG. 4 is a perspective view of the FIG. 1 bulb and apparatus for implementing the remaining method steps of the present invention.

The method of the present invention will now be described in further detail in connection with FIGS. 2–4. In the preferred method of the present invention, a method which has been found to work very successfully, the bulb 10 is first placed face-down in an agitated bath 21 of nitric acid. The acid may be, e.g. a 12% solution, at a temperature of about 60° C. The nitric acid provides a two-fold function. First, it causes the frit material 22, sometimes termed a frit "bead," along the sealing interface 18 on the outside of the bulb to be etched away until the frit material has a re-entrant cross-sectional configuration, allowing the subsequent thermoshocking operation to more efficiently separate the glass parts. Second, the nitric acid bath establishes the temperature of the glass bulb at approximately 60° C.

After the excess frit material has been sufficiently etched (shown at 23 in FIG. 3), the bulb is removed from the acid bath and placed face up on a bulb support. A drain shield 24 is placed about the faceplate 14 such that the edge surface 13 is covered by a gasket 26. The drain shield 24 and gasket 26 protect the edge surface 13 from being subjected to severe thermoshocks. In addition, the shield 24 prevents the water applied to the faceplate 14 from contacting the funnel 12. (It is desirable to have the bulb 10 in a face-up position when separation occurs so that the phosphor coating and shadow mask, which are located on the inside concave surface of the faceplate 14, do not come in contact with the water used in the subsequent thermo-shocking operation. The water could possibly cause damage to the phosphor coating and the shadow mask.)

With the glass bulb at approximately 60° C, the entire faceplate 14 and the corner regions 16 of the funnel 12 are downshocked, for a brief period of time, for example, approximately 3 to 5 seconds. While continuing the downshocking of the faceplate 14 and funnel corner regions 16, the side regions 20 of the funnel 12 are then downshocked for a predetermined period of time — e.g. approximately 7–12 seconds. To shock the faceplate 14 and funnel 12, water may be sprayed onto the faceplate 14 from an overhead nozzle 30 and onto the corner regions 16 of the funnel 12 by corner jets 32. Side jets 34 may be employed to spray water onto the side regions 20 of the funnel 12. The water temperature used to down-shock the various regions of the glass bulb 10 in the preferred method is approximately 30° C.

The result of the down-shocking of the faceplate 14 and the corner regions 16 is a limited separation at the sealing interface of the faceplate 14 from the funnel 12 — particularly in the corner regions thereof. The continued down-shocking of the faceplate 14 and funnel corner regions 16 with the additional down-shocking of the funnel side regions 20 result in the complete separation of the faceplate 14 from the funnel 12. If complete separation is not achieved, then the faceplate and the funnel corner and side regions are preferably up-shocked, as, e.g., by spraying water at a temperature of about 65° for about 5–10 seconds. This causes a reverse flexure of the faceplate 14, and thus puts the frit material 22 at the sealing interface 18 under further tension. This additional up-shocking generally succeeds in separating the faceplate 14 from the funnel 12 in those stubborn cases where the basic two-step down-shocking process is not totally successful.

In an alternative embodiment, the method of this invention may be carried out by the application of hot or cold air for up-shocking or down-shocking, respectively. The nozzle 30 and jets 32 and 34 in FIG. 4 would be adapted to exhaust hot or cold air instead of water. Large volumes of air would be needed to produce the equivalent effect of the water.

In yet another alternative embodiment, powdered magnesium or other solid granular material of good thermal conductivity could be used instead of water.

The invention is not limited to the particular details of the method depicted and the other modification in applications are contemplated. Certain changes may be made in the above-described method without parting from the true spirit and scope of the invention herein involved. It should be clearly understood that the present method need not be carried out using the apparatus depicted. Numerous other apparatus, processes and techniques may be employed to carry out the various operations which collectively constitute the method of the present invention. It is intended, therefore, that the subject matter in the above depiction shall be interpreted as illustrative and not in a limiting sense.

What is claimed is:

1. For use in salvaging parts from a color television cathod ray tube of a type having a glass bulb comprising an approximately rectangular, flangeless, curved faceplate and a funnel having a convex seal land which mates with a concave rear surface of the faceplate to define a contoured sealing interface, the faceplate being sealed to the funnel with a frit material located at the sealing interface, a method for separating the funnel and faceplate comprising:
    establishing a bulb to be opened at a predetermined initial temperature; and
    concurrently down-shocking (effecting a sudden cooling of the surface of) the faceplate and the corner regions of the funnel for a predetermined brief period of time to cause separation at the sealing interface of the faceplate from the corner regions of the funnel, and then down-shocking the side regions of the funnel near the sealing interface for a predetermined brief period of time while continuing to downshock the faceplate and the corner regions of the funnel to cause a complete separation of the faceplate from the funnel at the sealing interface.

2. The method defined in claim 1 wherein the brief period of time for down-shocking the faceplate and the corner regions of the funnel is about 3–5 seconds before the funnel side regions are down-shocked.

3. The method defined in claim 1 wherein the time interval for down-shocking the side regions of the funnel near the sealing interface (while continuing to downshock the faceplate and the funnel corner regions) is about 7–12 seconds.

4. The method defined in claim 1 wherein, in stubborn cases, the down-shocking of the faceplate, and the corner and side regions of the funnel, is immediately followed by up-shocking (effecting a sudden heating of the surface of) the faceplate and the corner and side regions of the funnel to cause reverse flexure of the faceplate, insuring complete separation of the faceplate from the funnel.

5. The method defined in claim 4 wherein the time interval for up-shocking the faceplate and the corner and side regions of the funnel is a predetermined brief period of time, in the range 5–10 seconds.

6. For use in salvaging parts from a color television cathode ray tube of a type having a glass bulb comprising an approximately rectangular, flangeless, curved faceplate and a funnel having a convex seal land which mates with and seals to a concave rear surface of the faceplate to define a contoured sealing interface, the faceplate being sealed to the funnel with a frit material located at the sealing interface, a method for separating the funnel and faceplate comprising:
    removing any frit material along said sealing interface on the outside surface of said bulb until the frit material has a re-entrant cross-sectional configuration;
    establishing the bulb at a predetermined initial temperature;
    down-shocking (effecting a sudden cooling of the surface of) the faceplate for a predetermined brief period of time by applying water to the faceplate at a temperature which is substantially lower than the initial bulb temperature, while simultaneously down-shocking corner regions of the funnel by applying water to the corner regions of the funnel by applying water to the corner regions at a temperature which is substantially lower than the initial bulb temperature causing separation of the faceplate from the corner regions of the funnel along the sealing interface; and
    then down-shocking side regions of the funnel near the sealing interface for a predetermined brief period of time by applying water to the side regions at a temperature which is substantially lower than the initial bulb temperature, while continuing the down-shocking of the faceplate and the corner regions of the funnel thereby causing the faceplate to completely separate from the funnel along the sealing interface.

7. The method defined in claim 6 wherein the time interval for down-shocking the faceplate and the corner regions of the funnel is about 3–5 seconds before the funnel side regions are down-shocked.

8. The method defined in claim 7 wherein the time interval for down-shocking the side regions of the funnel (while continuing to down-shock the faceplate and the funnel corner regions) is about 7–12 seconds.

9. The method defined in claim 7 wherein the initial predetermined bulb temperature is approximately 60° C.

10. The method defined in claim 9 wherein the water temperature for down-shocking areas of the glass bulb is approximately 30° C.

11. The method defined in claim 6 wherein, in stubborn cases, the down-shocking of the faceplate and the corner and side regions of the funnel is immediately followed by up-shocking (effecting a sudden heating of the surface of) the faceplate and the corner and side regions of the funnel near the sealing interface for a predetermined brief period of time, said up-shocking of the faceplate and corner and side regions of the funnel being achieved by the application of water at a temperature substantially above the initial bulb temperature.

12. The method defined in claim 11 wherein the initial predetermined bulb temperature is approximately 60 ° C, the water temperature for down-shocking the faceplate and the corner and side regions of the funnel is approximately 30° C, and the water temperature for up-shocking the faceplate and the corner and side regions of the funnel is approximately 65° C.

13. For use in salvaging parts from a color television cathode ray tube of a type having a glass bulb comprising an approximately rectangular, flangeless, curved faceplate having a convex front surface, concave rear surface, and a side edge surface connecting the front surface to the rear surface, the glass bulb also having a funnel having a convex seal land which mates with the concave rear surface of the faceplate to define a contoured sealing interface, the faceplate being sealed to the funnel with a frit material located at the sealing interface, a method for separating the funnel and faceplate comprising:
    placing the bulb face down in a nitric acid bath for a predetermined period of time to remove any frit material along the sealing interface of the bulb until the frit material has a re-entrant cross-sectional configuration;
    establishing the bulb at an initial temperature of approximately 60° C;
    attaching a drain shield about the side edge surface of the faceplate to prevent any water applied to the faceplate from contacting the funnel;
    supporting the bulb in a face-up position;
    simultaneously down-shocking (effecting a sudden cooling of the surface of) the faceplate and corner regions of the funnel for about 3 to 5 seconds by applying water at a temperature of approximately 30° C, causing separation of the faceplate from the funnel corner regions along the sealing interface; and then down-shocking side regions of the funnel for about 7–12 seconds by applying water at a temperature of approximately 30° C, while continuing the down-shocking of the faceplate and corner regions of the funnel thereby causing the faceplate to separate completely from the funnel along the sealing interface without damage to the faceplate or the funnel.

14. The method defined in claim 13 wherein the downshocking of the faceplate and the corner and side regions of the funnel is immediately followed by up-shocking (effecting a sudden heating of the surface of) the faceplate and the corner and side regions of the funnel near the sealing interface, said up-shocking being achieved by the application of water to the faceplate and the corner and side regions of the funnel for about 5–10 seconds, said water being at a temperature of approximately 65° C.

* * * * *